United States Patent
Nishida

(10) Patent No.: US 8,281,168 B2
(45) Date of Patent: Oct. 2, 2012

(54) DATA PROCESSOR

(75) Inventor: Yoichi Nishida, Kanagawa (JP)

(73) Assignee: Panasonic Corporation, Osaka (JP)

( * ) Notice: Subject to any disclaimer, the term of this patent is extended or adjusted under 35 U.S.C. 154(b) by 275 days.

(21) Appl. No.: 12/307,182

(22) PCT Filed: Mar. 27, 2008

(86) PCT No.: PCT/JP2008/000747
§ 371 (c)(1),
(2), (4) Date: Dec. 31, 2008

(87) PCT Pub. No.: WO2008/139677
PCT Pub. Date: Nov. 20, 2008

(65) Prior Publication Data
US 2010/0077242 A1    Mar. 25, 2010

(30) Foreign Application Priority Data
May 11, 2007    (JP) ................................. 2007-126766

(51) Int. Cl.
*G06F 1/00*    (2006.01)

(52) U.S. Cl. ........................................ 713/322; 713/310

(58) Field of Classification Search ................... 713/310, 713/322
See application file for complete search history.

(56) References Cited

FOREIGN PATENT DOCUMENTS

| JP | 2006-133698 A | 5/2006 |
|---|---|---|
| JP | 2006-243016 A | 9/2006 |

*Primary Examiner* — Paul R Myers
*Assistant Examiner* — Jeremy S Cerullo
(74) *Attorney, Agent, or Firm* — Pearne & Gordon LLP

(57) ABSTRACT

A data processor includes: a data input unit that inputs data in real time; an input data storing unit in which the inputted data is stored; a signal processing unit that reads out the stored data and performs signal processing of the stored data; a signal processing control unit that has the signal processing unit intermittently perform the signal processing faster than real-time; a clock/power source control unit that reduces power consumption by restricting a clock signal and/or electric power to the signal processing unit and the signal processing control unit in an inactive period of the intermittent operation; and an input monitor unit that monitors the volume of stored data, requests the clock/power source control unit to remove a clock or power restriction based on the volume, and requests the signal processing control unit to move into an active period of the intermittent operation.

12 Claims, 3 Drawing Sheets

DATA PROCESSOR

TECHNICAL FIELD OF THE INVENTION

The present invention relates to a data processor, and more particularly to a data processor for reproducing sound data and image data.

BACKGROUND OF THE INVENTION

As an example, a conventional data processor receives and decodes data broadcast at intervals, and stores data decoded from the data broadcast in a memory device. The conventional data processor does not receive and decodes the data broadcast in an inactive period. Therefore, the conventional data processor can reduce its electric power consumption by stopping supplying an electric power in the inactive period (see for example patent document 1).

Patent document 1: Japanese Patent Laid-Open Publication No. H11-122586

DISCLOSURE OF THE INVENTION

Problems to be Solved by the Invention

The above-mentioned conventional data processor can reduce the electric power consumption under the condition that the data processor is used for receiving the data broadcast which is updated several times a day. However, the above-mentioned conventional data processor can not reduce the electric power consumption under the condition that the data processor is used for processing and reproducing continuous audio-visual data and broadcast signal in real time.

It is therefore an object of the present invention to provide a data processor which can reduce an electric power necessary to reproduce data in real time.

Means to Solve the Problem

In order to solve the above problems, a data processor according to the present invention comprises: a data input unit into which data is inputted; an input data storing unit in which the data inputted into the data input unit is stored; a signal processing unit operable to read out the data stored in the input data storing unit, and perform signal processing of data read from the input data storing unit; a signal processing control unit operable to control the signal processing unit to have the signal processing unit perform an intermittent operation by having the signal processing unit perform the signal processing at a processing speed faster than a speed at which the data is inputted into the data input unit; a clock/power source control unit operable to reduce electric power consumption of the signal processing unit and the signal processing control unit by restricting either or both a clock signal and an electric power to at least one section of the signal processing unit and the signal processing control unit in an inactive period of the intermittent operation; and an input monitor unit operable to monitor the volume of data in the input data storing unit, to request the clock/power source control unit to remove the restriction of either or both a clock signal and an electric power to at least one section of the signal processing unit and the signal processing control unit on the basis of the volume of data in the input data storing unit, and to request the signal processing control unit to move into an active period of the intermittent operation.

Advantageous Effect of the Invention

The data processor according to the present invention can reduce an electric power necessary to reproduce contents in real time.

BRIEF DESCRIPTION OF THE REFERENCE NUMERALS

Figure 1:
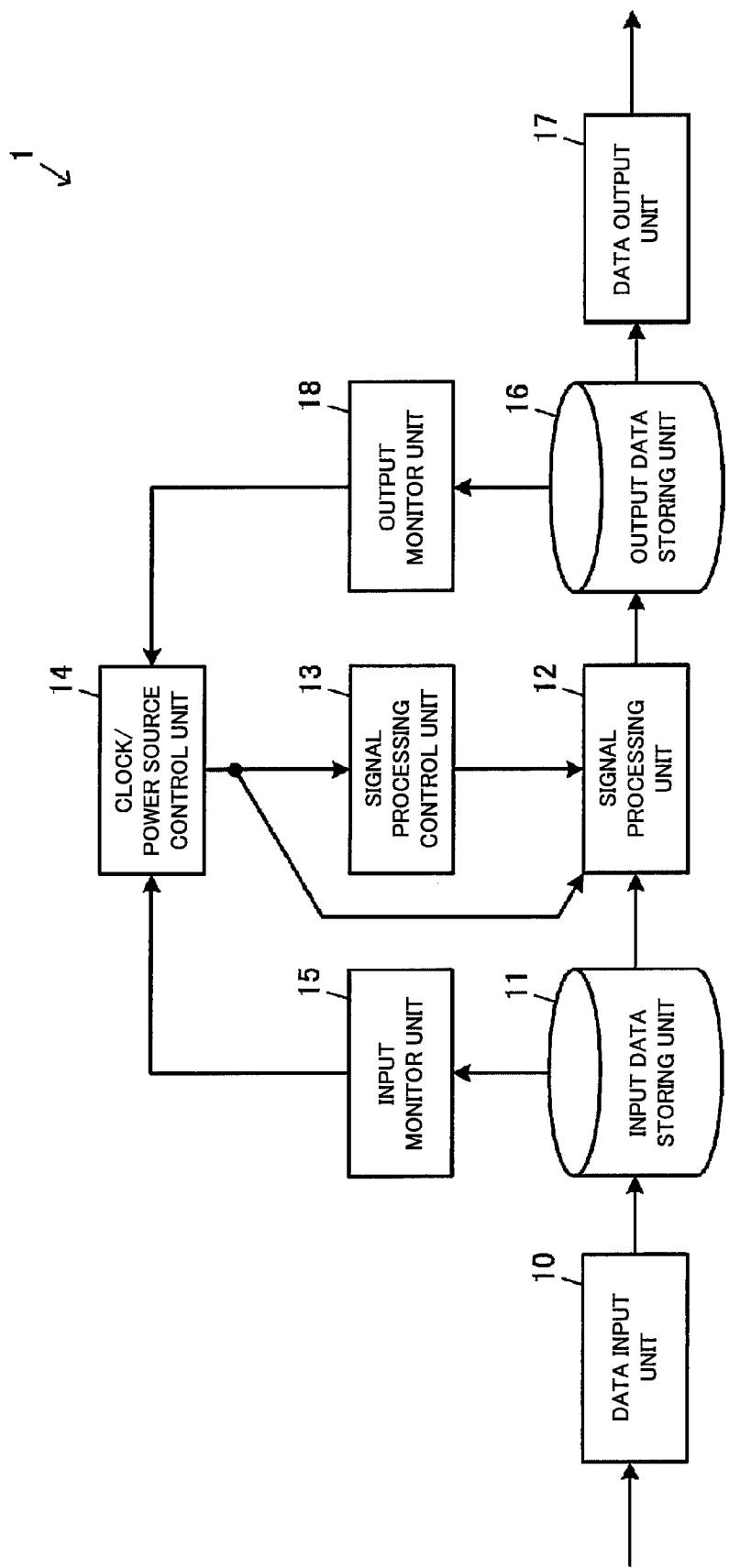
FIG. 1 is a block diagram showing the construction of the data processor according to one preferred embodiment of the present invention.

1: data processor
10: data input unit
11: input data storing unit
12: signal processing unit
13: signal processing control unit
14: clock/power source control unit
15: input monitor unit
16: output data storing unit
17: data output unit
18: output monitor unit One preferred embodiment of the data processor according to the present invention will now be described with reference to accompanying drawings.

FIG. 1 is a block diagram showing the data processor according to the preferred embodiment of the present invention.

As shown in FIG. 1, the data processor 1 comprises a data input unit 10 through which data is inputted in real time, an input data storing unit 11 in which the data inputted through the data input unit 10 is stored, a signal processing unit 12 operable to read out data stored in the input data storing unit 11, and to process data read from the input data storing unit 11, a signal processing control unit 13 operable to control the signal processing unit 12 to have the signal processing unit 12 perform an intermittent operation, a clock/power source control unit 14 operable to control either or both a clock signal and an electric power to the signal processing unit 12 and the signal processing control unit 13, an input monitor unit 15 operable to monitor the volume of data in the input data storing unit 11, an output data storing unit 16 in which the data processed by the signal processing unit 12 is stored, a data output unit 17 operable to read out data stored in the output data storing unit 16, and to output the data read from the output data storing unit 16, and an output monitor unit 18 operable to monitor the volume of data in the output data storing unit 16.

The data stored in a memory medium such as memory card, magnetic disc, optical disc and the like, or the data received by a network module (not shown) or a broadcast receiver is inputted into the data input unit 10 in real time. The data input unit 10 is constituted by an analog-to-digital converter, converts the input data to digital data, and stores the digital data in the input data storing unit 11 in real time.

Here, the data to be inputted into the data input unit 10 is constituted by compressed audio data based on a method such as for example MP3 (MPEG-1 Audio Layer 3), AAC (Advanced Audio Coding), and WMA (Windows (registered trademark) Media Audio), or constituted by non-compressed audio data based on a method such as for example PCM (Pulse Code Modulation). In this embodiment, data to be inputted into the data input unit 10 is exemplified by a sound.

The input data storing unit 11 and the output data storing unit 16 are respectively constituted by memory devices. The input data is stored in, and the output data is read from the memory devices on the basis of a first-in first-out (FIFO) method.

The input monitor unit 15 is constituted by a processor such as microcomputer or a hardware circuit, and outputs a first interrupt signal to the clock/power source control unit 14 when judging that the volume of data in the input data storing unit 11 is larger than or equal to a threshold level TH1 which is previously defined to prevent the input data storing unit 11 from being excessively filled with the data from the data input unit 10.

The output monitor unit 18 is constituted by a processor such as microcomputer or a hardware circuit, and outputs a second interrupt signal to the clock/power source control unit 14 when judging that the volume of data in the output data storing unit 16 is smaller than or equal to a threshold level TH2 which is previously defined to prevent the data in the output data storing unit 16 from being excessively reduced to zero.

The signal processing unit 12 is constituted by a signal processor such as digital signal processor (DSP) or the like, processes the data read from the input data storing unit 11, and stores the processed data in the output data storing unit 16.

Here, the signal processing unit 12 may be constituted by a hardware circuit in place of a signal processor such as DSP, or constituted by a hardware circuit and a signal processor.

When the data to be inputted into the data input unit 10 is indicative of a sound, the signal processing unit 12 may perform decompression of data, sound quality conversion such as equalizing, and the like as being included in the signal processing of data.

In this embodiment, the signal processing unit 12 obtains data based on a linear PCM method by processing the data, and stores the data based on a linear PCM method in the output data storing unit 16.

The data output unit 17 is constituted by a digital-to-analog converter, reads out data stored in the output data storing unit 16 in real time, performs digital-to-analog conversion of the data read from the output data storing unit 16, and outputs to an external loudspeaker.

The signal processing control unit 13 is constituted by a processor such as a microcomputer for controlling each part of the data processor 1, and instructs the signal processing unit 12 to start and stop processing data.

Specifically, the signal processing control unit 13 controls the signal processing unit 12 to have the signal processing unit 12 perform an intermittent operation by having the signal processing unit 12 perform the signal processing at a processing speed faster than a real-time processing speed.

More specifically, the signal processing control unit 13 issues an instruction to the signal processing unit 12 about the volume of data to be processed by the signal processing unit 12. The signal processing control unit 13 receives, from the signal processing unit 12, information that the signal processing unit 12 has just completed the signal processing of data. The signal processing control unit 13 repeats an instruction to the signal processing unit 12 about the volume of data to be processed by the signal processing unit 12 in response to the first and second interrupt signals from the input monitor unit 15 and the output monitor unit 18. This leads to the fact that the signal processing unit 12 performs the intermittent operation by assuming an active state and an inactive state alternatively.

The clock/power source control unit 14 reduces the electric power consumption of the data processor 1 by controlling either or both a clock signal and an electric power to at least one section of the signal processing unit 12 and the signal processing control unit 13 when the signal processing unit 12 is in the inactive state. Here, the above-mentioned section of the signal processing control unit 13 includes a section for controlling the signal processing unit 12.

When restricting the clock signal to be supplied to at least one section of the signal processing unit 12 and the signal processing control unit 13, the clock/power source control unit 14 controls a clock signal generating circuit (operable to generate a clock signal, and not shown) to stop supplying the clock signal, or reduces the frequency or the voltage of the clock signal.

When restricting the electric power to at least one section of the signal processing unit 12 and the signal processing control unit 13, the clock/power source control unit 14 controls a power source (operable to supply an electric power, and not shown) to stop supplying the electric power, or reduces the frequency or the voltage of the electric power.

More specifically, a memory medium (not shown) such as a resister or the like has information indicating conditions of a clock signal (such as for example frequency, voltage, and whether or not to supply the clock signal) and conditions of an electric power (such as for example voltage and whether or not to supply the electric power) to be supplied to at least one section of the signal processing unit 12 and the signal processing control unit 13 when the signal processing unit 12 is in each of the active state and the inactive state. The clock/power source control unit 14 controls the clock signal and the electric power to be supplied to at least one section of the signal processing unit 12 and the signal processing control unit 13.

The operation of the data processor 1 thus constructed as previously mentioned will be described hereinafter with reference to FIGS. 2 and 3.

Figure 2:
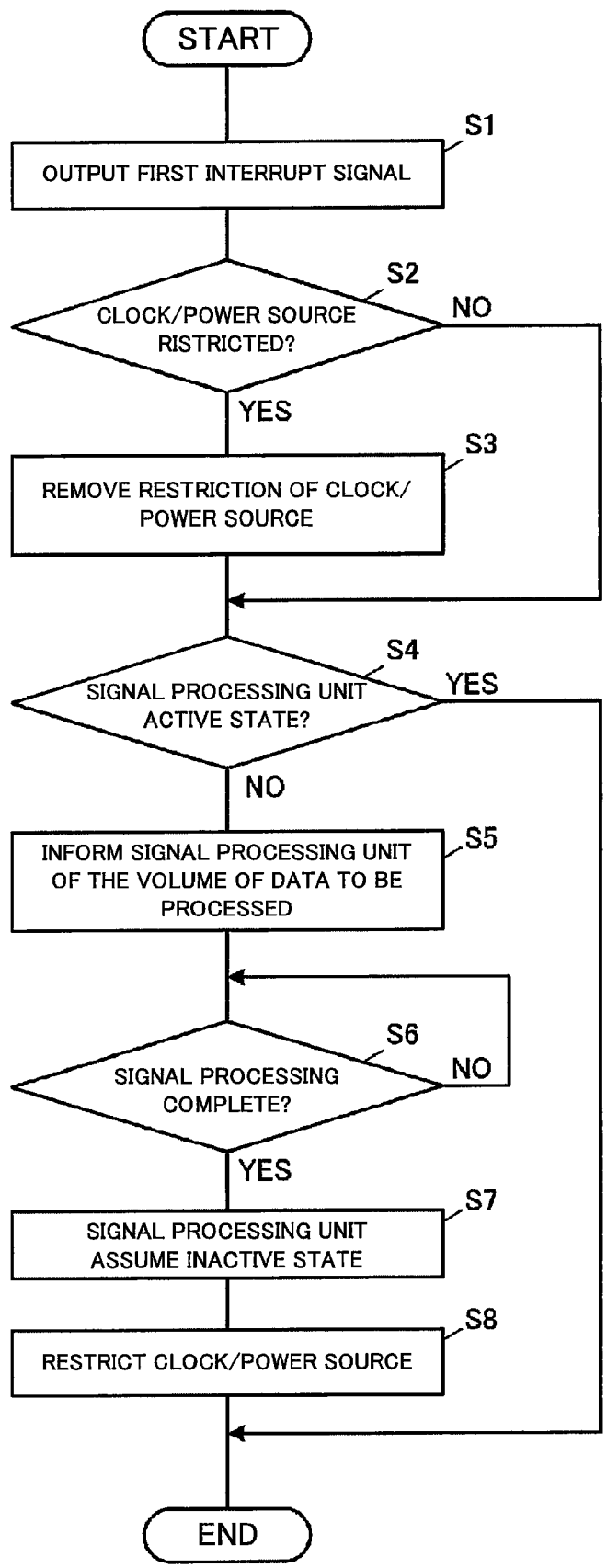
FIG. 2 is a flow chart for explaining an input operation of the data processor according to the preferred embodiment of the present invention.

FIG. 2 is a flow chart for explaining an input operation of the data processor 1. Here, the data processor 1 starts the input operation when the volume of data in the input data storing unit 11 reaches or exceeds a threshold level TH1.

The first interrupt signal is outputted to the clock/power source control unit 14 by the input monitor unit 15 (in step S1). When the judgment is made that the clock/power source control unit 14 is restricting the clock signal and the electric power to at least one section of the signal processing unit 12 and the signal processing control unit 13 (in step S2), the clock/power source control unit 14 removes the restriction of the clock signal and the electric power in response to the first interrupt signal (in step S3).

The judgment is then made by the signal processing control unit 13 on whether or not the signal processing unit 12 is in the active state (in step S4) when the clock/power source control unit 14 removes the restriction of the clock signal and the electric power to at least one section of the signal processing unit 12 and the signal processing control unit 13. The data processor 1 stops performing the input operation when the judgment is made that the signal processing unit 12 is in the active state.

When, on the other hand, the judgment is made that the signal processing unit 12 is not in the active state, the signal processing control unit 13 indicates the volume of data to be processed by the signal processing unit 12 (in step S5). The signal processing unit 12 performs the signal processing of data on the basis of the indication from the signal processing control unit 13. The signal processing unit 12 assumes the inactive state (in step S7) when completing the signal processing of data (in step S6).

When the clock/power source control unit 14 receives, from the signal processing unit 12 through the signal processing control unit 13, information that the signal processing unit 12 has just assumed the inactive state, the clock/power source control unit 14 restricts either or both a clock signal and an electric power to at least one section of the signal processing unit 12 and the signal processing control unit 13 (in step S8).

Figure 3:
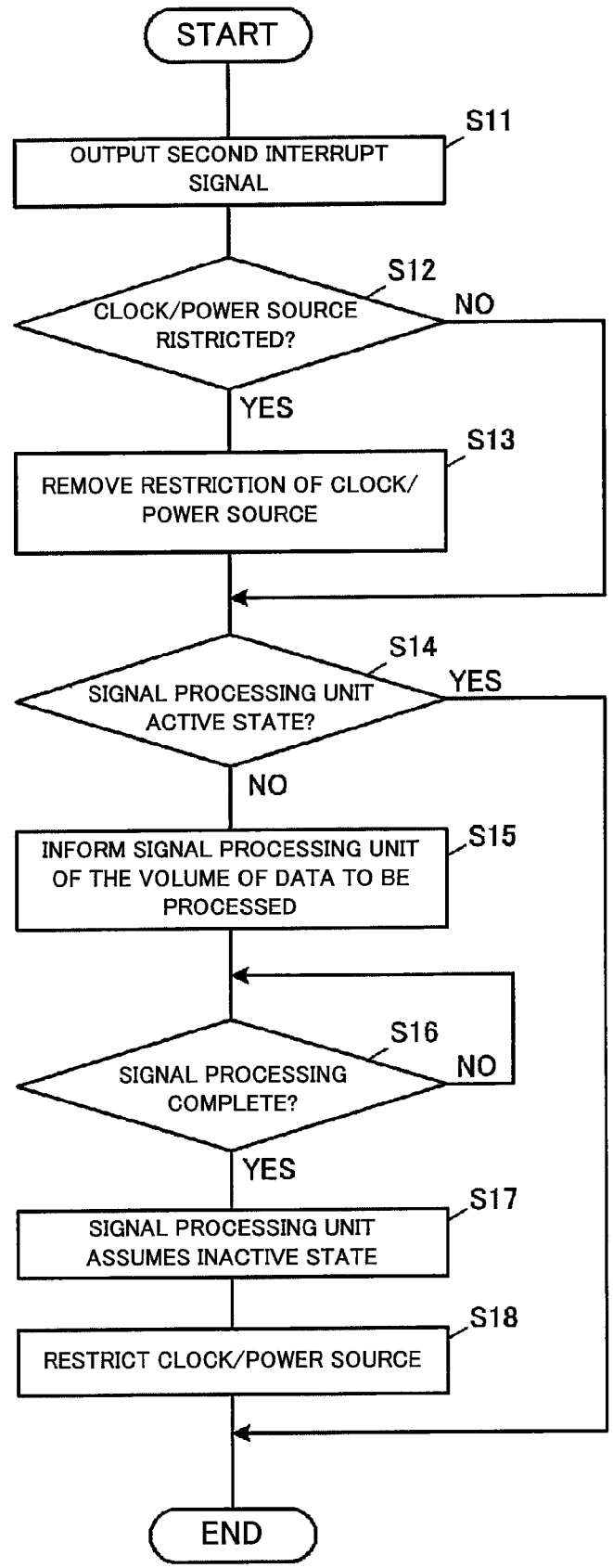
FIG. 3 is a flow chart for explaining an output operation of the data processor according to the preferred embodiment of the present invention.

FIG. 3 is a flow chart for explaining an output operation of the data processor 1. The data processor 1 starts the output operation when the volume of data in the output data storing unit 16 is smaller than or equal to a threshold level TH2. The output operation is performed by the data processor 1 without depending on the input operation.

The second interrupt signal is firstly outputted to the clock/power source control unit 14 by the output monitor unit 18 (in step S11). When the judgment is made that the clock/power source control unit 14 is restricting either or both the clock signal and the electric power to at least one section of the signal processing unit 12 and the signal processing control unit 13 (in step S12), the clock/power source control unit 14 removes the restriction of either or both the clock signal and the electric power to at least one section of the signal processing unit 12 and the signal processing control unit 13 in response to the second interrupt signal (in step S13).

After the restriction of either or both the clock signal and the electric power to at least one section of the signal processing unit 12 and the signal processing control unit 13 is removed, the signal processing control unit 13 makes a judgment on whether or not the signal processing unit 12 is in the active state of the intermittent operation (in step S14). When the judgment is made that the signal processing unit 12 is in the active state of the intermittent operation, the data processor 1 completes the output operation.

When, on the other hand, the judgment is made that the signal processing unit 12 is not in the active state of the intermittent operation, the signal processing control unit 13 indicates the volume of data to be processed by the signal processing unit 12 (in step S15). the signal processing unit 12 performs the signal processing of data on the basis of the indication from the signal processing control unit 13, and assumes the inactive state of the intermittent operation (in step S17) when completing the signal processing of data (in step S16).

When the clock/power source control unit 14 receives, from the signal processing unit 12 through the signal processing control unit 13, information that the signal processing unit 12 has assumed the inactive state of the intermittent operation, the clock/power source control unit 14 restricts either or both the clock signal and the electric power to at least one section of the signal processing unit 12 and the signal processing control unit 13 (in step S18).

From the foregoing description, it will be understood that the data processing unit according to the preferred embodiment of the present invention can reduce an electric power necessary to reproduce data in real time by restricting either or both a clock signal and an electric power to at least one section of the signal processing unit 12 and the signal processing control unit 13 in the inactive period of the intermittent operation.

Additionally, the signal processing control unit 13 may have a timer, and allow the signal processing unit 12 to perform the intermittent operation by instructing the signal processing unit 12 to stop processing the data on the basis of the elapsed time measured by the timer.

When the remaining data in the input data storing unit 11 becomes equal to or smaller than a threshold level TH3 (TH3<TH1), the input monitor unit 15 may output the third interrupt signal to the signal processing control unit 13. When, on the other hand, the remaining data in the output data storing unit 16 becomes equal to or larger than a threshold level TH4 (TH4<TH2), the output monitor unit 18 outputs the fourth interrupt signal to the signal processing control unit 13.

Here, the threshold level TH3 is previously defined so as not to deplete the data stored in the input data storing unit 11. The threshold level TH4 is previously defined so as not to overflow with data from the output data storing unit 16.

In this case, the signal processing control unit 13 instructs the signal processing unit 12 to stop processing the data in response to the third or the fourth interrupt signal from the input monitor unit 15 and the output monitor unit 18 to ensure that the signal processing unit 12 performs the intermittent operation, instead of informing about the volume of data to be processed by the signal processing unit 12.

INDUSTRIAL APPLICABILITY

The data processor according to the present invention is useful as an audio player and a video player for a battery-powered mobile device, and a mobile phone operable to performing an audio-visual processing of data.

The invention claimed is:

1. A data processor comprising:
    a data input unit into which data is inputted;
    an input data storing unit in which said data inputted into said data input unit is stored;
    a signal processing unit operable to read out said data stored in said input data storing unit, and perform signal processing of data read from said input data storing unit;
    a signal processing control unit operable to control said signal processing unit to have said signal processing unit perform an intermittent operation by having said signal processing unit perform said signal processing at a processing speed faster than a speed at which said data is inputted into said data input unit;
    a clock/power source control unit operable to reduce electric power consumption of said signal processing unit and said signal processing control unit by restricting either or both a clock signal and an electric power to at least one section of said signal processing unit and said signal processing control unit in an inactive period of said intermittent operation; and
    an input monitor unit operable to monitor the volume of data in said input data storing unit, to request said clock/power source control unit to remove the restriction of either or both a clock signal and an electric power to at least one section of said signal processing unit and said signal processing control unit on the basis of said volume of data in said input data storing unit, and to request said signal processing control unit to move into an active period of said intermittent operation.

2. A data processor according to claim 1, wherein said input monitor unit makes the requests to said clock/power source control unit and said signal processing control unit when said volume of data in said input data storing unit becomes equal to or larger than a predetermined threshold level.

3. A data processor according to claim 1, further comprising:

an output data storing unit in which said data processed by said data processing unit is stored;

a data output unit operable to read out and output data stored in said output data storing unit; and an output monitor unit operable to monitor the volume of data in said output data storing unit, to request said clock/power source control unit to remove the restriction of either or both a clock signal and an electric power to at least one section of said signal processing unit and said signal processing control unit on the basis of said volume of data in said output data storing unit, and to request said signal processing control unit to move into an active period of said intermittent operation.

4. A data processor according to claim 3, wherein said output monitor unit makes the requests to said clock/power source control unit and said signal processing control unit when said volume of data in said input data storing unit becomes equal to or smaller than said predetermined threshold level.

5. A data processor according to claim 3, wherein said data output unit performs a digital-to-analog conversion of said data stored in said output data storing unit.

6. A data processor according to claim 1, wherein said data to be inputted into said data input unit is constituted by compressed data, said signal processing of data includes a data decompression.

7. A data processor according to claim 1, wherein said data to be inputted into said data input unit is indicative of a sound, said signal processing of data includes a sound quality conversion.

8. A data processor according to claim 1, wherein said data input unit performs an analog-to-digital conversion of said inputted data.

9. A data processor according to claim 1, wherein said clock/power source control unit restricts said electric power consumption of said signal processing unit and said signal processing control unit by reducing a frequency of said clock signal to at least one section of said signal processing unit and said signal processing control unit.

10. A data processor according to claim 1, wherein said clock/power source control unit restricts said electric power consumption of said signal processing unit and said signal processing control unit by stopping supplying said clock signal to at least one section of said signal processing unit and said signal processing control unit.

11. A data processor according to claim 1, wherein said clock/power source control unit reduces said electric power consumption of said signal processing unit and said signal processing control unit by reducing a voltage applied to at least one section of said signal processing unit and said signal processing control unit.

12. A data processor according to claim 1, wherein said clock/power source control unit reduces said electric power consumption of said signal processing unit and said signal processing control unit by stopping applying a voltage to at least one section of said signal processing unit and said signal processing control unit.

* * * * *